United States Patent [19]

Kissinger, Sr.

[11] Patent Number: 4,970,509

[45] Date of Patent: Nov. 13, 1990

[54] ALARM SYSTEM FOR WARNING A LAND MOTOR VEHICLE DRIVER OF THE PRESENCE OF A ROADWAY EDGE

[76] Inventor: Kent A. Kissinger, Sr., Box 1390, Rd. #1, Berwick, Pa. 18603

[21] Appl. No.: 453,905

[22] Filed: Dec. 20, 1989

[51] Int. Cl.[5] .............................................. G08G 9/02
[52] U.S. Cl. ...................................... 340/901; 378/1; 364/460
[58] Field of Search ................. 340/901, 435; 404/84; 378/1, 44; 250/302; 180/167, 168; 364/460, 461

[56] References Cited

U.S. PATENT DOCUMENTS

| | | | |
|---|---|---|---|
| 2,750,583 | 6/1956 | McCullough | 340/901 X |
| 3,124,690 | 3/1964 | Savin | 378/1 X |
| 3,201,750 | 8/1965 | Morin | 340/901 X |
| 3,947,815 | 3/1976 | Muncheryan . | |
| 4,059,830 | 11/1977 | Threadgill . | |
| 4,219,092 | 8/1980 | Richter | 378/44 X |
| 4,348,652 | 9/1982 | Barnes . | |

FOREIGN PATENT DOCUMENTS 3240498  5/1984  Fed. Rep. of Germany ...... 340/901

OTHER PUBLICATIONS

Belove, Charles, *Handbook of Modern Electronics and Electrical Engineering*, (New York, Wiley & Sons, 1986), pp. 517–519.
Van Valkenburg & Kinariwala, *Linear Circuits* (Prentice-Hall Inc., pp. 404–408).
Glasstone, Samuel, *Sourcebook on Atomic Energy*, (Robert E. Krieger Publ. Co.), pp. 198–224.

*Primary Examiner*—Joseph A. Orsino
*Assistant Examiner*—Brian R. Tumm
*Attorney, Agent, or Firm*—T. M. Gernstein

[57] ABSTRACT

An alarm system is used in conjunction with a land motor vehicle to warn a driver that he is either too close to a roadway edge or is approaching that edge too rapidly. The alarm system uses material in a line marking the edge of the roadway that generates nuclear particles, and includes a detector system that activates a visual alarm if the vehicle is merely drifting towards the roadway edge and activates an audible alarm if the vehicle approaches the edge so rapidly or is so close to the edge as to require a sharp swerving action by the driver.

3 Claims, 3 Drawing Sheets

ALARM SYSTEM FOR WARNING A LAND MOTOR VEHICLE DRIVER OF THE PRESENCE OF A ROADWAY EDGE

TECHNICAL FIELD OF THE INVENTION

The present invention relates to the general art of land vehicles, and to the particular field of accessories for land motor vehicles.

BACKGROUND OF THE INVENTION

Hundreds, possibly thousands, of drivers are injured annually because they accidentally drive off of a roadway. Some drives are actually killed as their vehicle impacts objects, such as trees or other immobile objects, at high speeds.

Often, the vehicle is driven off of the roadway due to simple inattentiveness by the driver, or because the driver has fallen asleep at the wheel.

While the art does contain sleep alarms such as devices that are worn by the driver and which will emit an audible alarm signal should the driver's head droop, such devices are dependant on driver movement Should the driver be otherwise alert, but simply not paying attention to the road itself, such devices may not be effective. Thus, many driver alarms are inferential in nature in that they infer a potential danger due to the existence of another condition, such as a driver's head nodding. This is not always the most effective way of protecting the driver or the passengers of a land motor vehicle.

Still another situation that exists in which the driver may accidentally drive off of the roadway while being quite alert, is the situation in which the roadway is not fully visible, such as at night, or under snow conditions. The driver may be drifting towards the roadway side and yet not know it, or be trying to turn into a cross street before or after the intersection of that cross street and the roadway. In situations such as this, the driver may still drive off of the roadway, yet the abovedescribed devices will be of little use in warning him of the impending mistake.

Still further, the alarm devices, such as just described, do not differentiate to the driver what sort occurrence is being signaled. Thus, the driver is not given sufficient information to make a proper correction by such devices. For example, if the driver is simply drifting toward an incorrect driving path, that driver should be warned in a manner that will permit a gentle correction; however, if the vehicle is swerving dangerous)y into a dangerous path, the driver should be warned in a manner that will cause a rapid and strong correction. On the other hand, it is not desirable to cause the driver to swerve when only a gentle correction is necessary. An improper driving correction may be ineffective at best if the driver attempts to gently correct when a sharp swerve is required, and dangerous at worst if the driver swerves into an oncoming lane of traffic while under the impression a swerve maneuver is required when only a gentle correction maneuver is actually required. Since present devices do not make such distinctions in the alarm condition, they are prone to delivering a warning containing insufficient information to take the most effective and safest corrective maneuvers.

Therefore, there is a need for an alarm system for use in a motor land vehicle to warn the driver that the vehicle is either too close to the edge of the roadway or is approaching that roadway edge at a dangerous velocity, and which can be used even if the roadway edge is not visible to the driver, and that is capable of providing condition-specific information to the driver to enable that driver to take the corrective action that is safest and most desirable for the particular condition that exists.

OBJECTS OF THE INVENTION

It is a main object of the present invention is to provide an alarm system for use in a motor land vehicle to warn the driver that the vehicle is too close to the edge of the roadway.

It is another object of the present invention to provide an alarm system for use in a motor land vehicle to warn the driver that the vehicle is too close to the edge of the roadway or is approaching that roadway edge at a dangerous velocity.

It is another object of the present invention to provide an alarm system for use in a motor land vehicle to warn the driver that the vehicle is too close to the edge of the roadway or is approaching that roadway edge at a dangerous velocity, and which can be used even if the roadway edge is not Visible to the driver.

It is another object of the present invention to provide an alarm system for use in a motor land vehicle to warn the driver that the vehicle is too close to the edge of the roadway or is approaching that roadway edge at a dangerous velocity, and which can be used even if the roadway edge is not visible to the driver, and that is capable of providing condition-specific information to the driver to enable that driver to take the corrective action that is safest and most desirable for the particular condition that exists.

SUMMARY OF THE INVENTION

These, and other, objects are achieved by an alarm system that includes a roadway marking line on each side of the roadway that includes material that generates nuclear radiation and a nuclear radiation detector system in the land motor vehicle. The detector system includes a visual alarm that is activated if the vehicle simply gets too close to the side of the roadway, and an audible alarm that is activated when the vehicle gets dangerously close to the side of the roadway. The system also includes a microcomputer which analyzes the relative intensity of the nuclear radiation being detected with respect to that radiation received in a preceding time interval. If the rate at which such intensity increases exceeds a preset value, the microcomputer causes the system to activate the audible alarm.

In this manner, the driver will be alerted if the vehicle is simply too close to the side of the roadway, but will be actively warned if the vehicle is either dangerously close to that roadway side or is approaching it in a manner or at a velocity that will require immediate and intense action in order to permit the driver to take successive evasive action without experiencing loss of control. This system will be useable in dark conditions or when the roadway side is otherwise obscured from the driver's vision so it can be used as a tracking means as well as an alarm means.

The system will thus give the driver condition-specific information so that the exact condition being faced will be identified. In this manner, the simple drift towards the side of the roadway will be identified in a manner that is different from the dangerous swerve towards that roadway edge. The driver will know to simply effect a gentle correction in the first instance and to swerve sharply in the second instance, but will not swerve sharply in the first instance or try to gently correct in the second instance so that the proper driving maneuver will be effected.

BRIEF DESCRIPTION OF THE DRAWING FIGURES

DETAILED DESCRIPTION OF THE PREFERRED EMBODIMENT OF THE INVENTION

Figure 1:
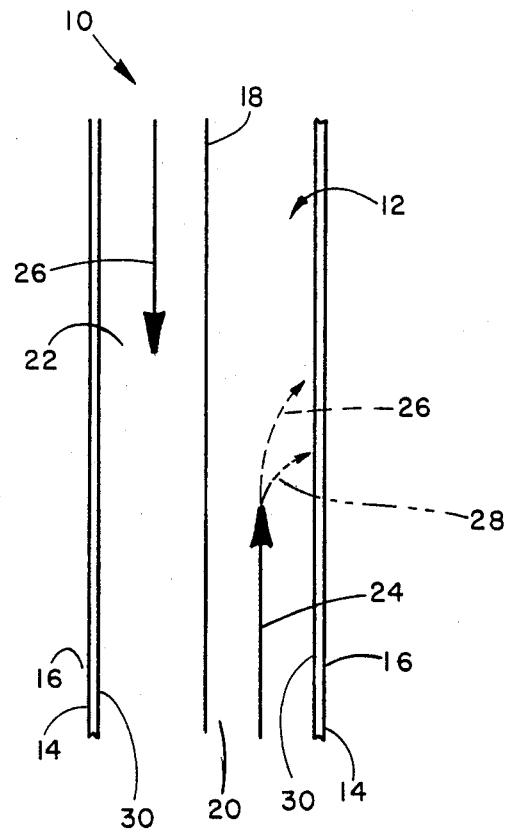
FIG. 1 is a schematic view of a roadway showing the paths of interest to the present invention.

Illustrated in FIG. 1 is a roadway 10 having a driving surface 12 bounded by roadway side edges 14 that define the roadway shoulder 16. The roadway 10 is shown as being divided by a center line 18 into two lanes 20 and 22, but could include only one lane or a plurality of lanes. The traffic pattern on the roadway 10 is indicated by the direction arrows 24 and 26.

As indicated in FIG. 1, the vehicle traveling in direction 24 can move in a variety of directions, which include the normal direction, indicated by the arrow 24. However, the vehicle can also drift toward the side of the roadway, as indicated by the single dotted chain line 26, or it can swerve toward the side of the roadway in a sudden and, perhaps, dangerous, velocity indicated by the double dotted chain line 28. In either instance, the vehicle is in danger of going off of the roadway, and the driver should be alerted in the first instance, and sharply and decisively warned in the second instance so that proper, and safe, driving maneuvers can be effected.

The alarm system of the present invention is intended to warn the driver of such conditions in a manner that will permit that driver to differentiate what type of maneuver is to be undertaken. This will prevent the driver from swerving sharply when only a slight correction is in order, or from simply trying a simple and gentle correction when a sharp swerve is required.

Figure 2:
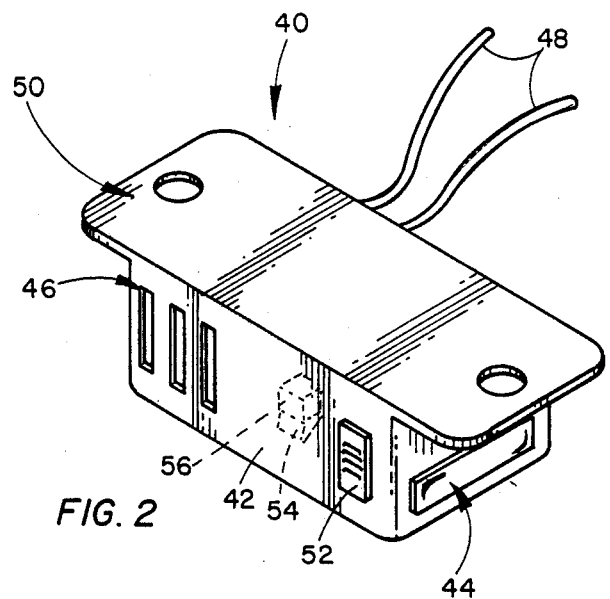
FIG. 2 is a perspective view of a detector system used in the alarm system of the present invention.
Figure 3:
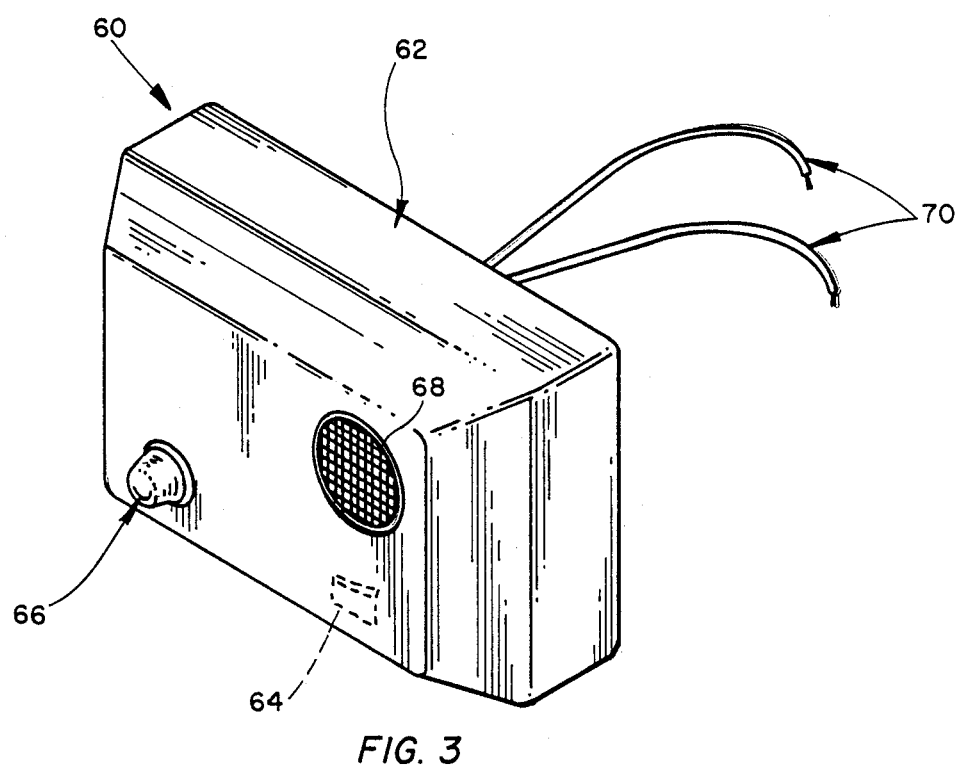
FIG. 3 is a perspective view of an alarm assembly used in the alarm system of the present invention.

The basic components of the alarm system are shown in FIGS. 1, 2 and 3 as including two roadway edge marking lines 30 that extend along the roadway edge. Each of the lines 30 is impregnated with nuclear material that emits nuclear radiation, such as alpha, beta or gamma particles. Such materials are well known to those skilled in the nuclear arts from basic textbooks, such as "Sourcebook on Atomic Energy" by Samuel Glasstone and published by Robert E. Krieger publishing company of Malabar Florida in 1979, the disclosure of which is incorporated herein by reference.

Each vehicle has a nuclear radiation detector system mounted thereon. A nuclear radiation detector system 40 is indicated in FIG. 2 as including a housing 42 that is mounted on the fender of the motor vehicle in position to be exposed to the radiation emitted from the lines 30. The housing has a sensor 44 located thereon, and a transmitter 46 associated therewith. Line conductors 48 connect the detector system and the transmitter to a power source, such as the vehicle battery, and to the remainder of the system as will be evident from the ensuing discussion. A bracket 50 is used to attach the housing to the vehicle, and, if suitable, an on/off switch 52 can be included on the housing 42.

The detector system includes a semiconductor ionization detector unit 54, such as disclosed in standard textbooks such as "Handbook of Modern Electronics and Electrical Engineering" edited by Charles Belove and published by Wiley-Interscience in 1986, the disclosure of which is incorporated herein by reference. In such a detector, the nuclear particles cause ionization by creating and separation of electron-hole pairs in the depletion region. The response of such a detector is proportional to the impinging energy, regardless of the type of radiation, and thus such a device is used to determine the proximity of the vehicle to the roadway side edges since the response increases as the vehicle approaches the edge of the roadway. The transducer also uses intensity of the impinging particles as well. The intensity of such impinging particles is here defined as being the number of particles impinging on the transducer, and thus is represented by a unit that includes "number of impinging particles per unit area". The alarm system thus emits a signal that is more and more apparent and attention grabbing as the vehicle gets closer and closer to the roadway edge. The detector is an active transducer that generates an output voltage in response to the radiation detected. This output voltage is suitably amplified according to known principles using known circuit elements to be used in the remainder of the alarm system. Such active transducers are discussed in the incorporated "Handbook of Modern Electronics and Electrical Engineering". Other detectors are disclosed in the incorporated "Sourcebook on Atomic Energy".

The detector will emit a first output voltage upon detecting nuclear radiation having a first intensity level as on path 26 when the vehicle is still far enough away from the roadway edge so that a driver can correct the error by simple gentle correction. The detector will also emit a second output voltage upon detecting nuclear radiation of a second intensity level that is greater than the first intensity level when a rapid and intense correction is required, such as when the vehicle is on swerve path 28 or has approached the roadway side edge so closely as to require rapid action to avoid moving off of the roadway. As will be discussed below, this output voltage is further modified by the system to assure that the proper alarm is activated.

The detector unit 40 also includes a microcomputer 56 which includes a software program which is designed to use preset time increments, and to compare each signal generated by the sensor during a first pre-set time increment to the signal received by the sensor in the prior pre-set time increment and to further increase the voltage output from the sensor should the voltage output from the sensor increase at a predetermined rate. Such intensity increase will be used to indicate that the vehicle is approaching the roadway side edge at a velocity that will require severe correction by the driVer, as would be the case if the vehicle accidentally began to swerve sharply towards the roadside edge along path 28 rather than simply drifting towards that edge along path 26. The increased output voltage associated with the detector transducer as the vehicle moves, even at a drift along path 26, too close to the roadway edge will also be used to activate a more intense alarm signal to the driver by suitably adjusting the software program to increase the signal if the sensor output voltage increases beyond a preset value. Suitable computer programs are available and are known to those skilled in the art.

The system further includes an alarm unit 60 that is indicated in FIG. 3. The unit 60 is mounted in the vehicle near the driver, preferably on the dashboard of that vehicle. The unit 60 includes a housing 62 that has a suitable receiver circuit 64 contained therein. The unit also includes a visual alarm 66 that is used to alert the driver of the need for a gentle correction, and an audible alarm 68 that is used to alert the driver of the need of a sharp correction. The circuit is designed to activate one or both of these alarms as the need arises. The intensity of the audible alarm is also varied according to the severity of the driving correction required. Such design includes circuit elements that will be suitably activated by the output of the detector as discussed above. The receiver is connected to a power source, such as the vehicle battery, and to the detector unit 40 via the line conductors 70.

Figure 4:
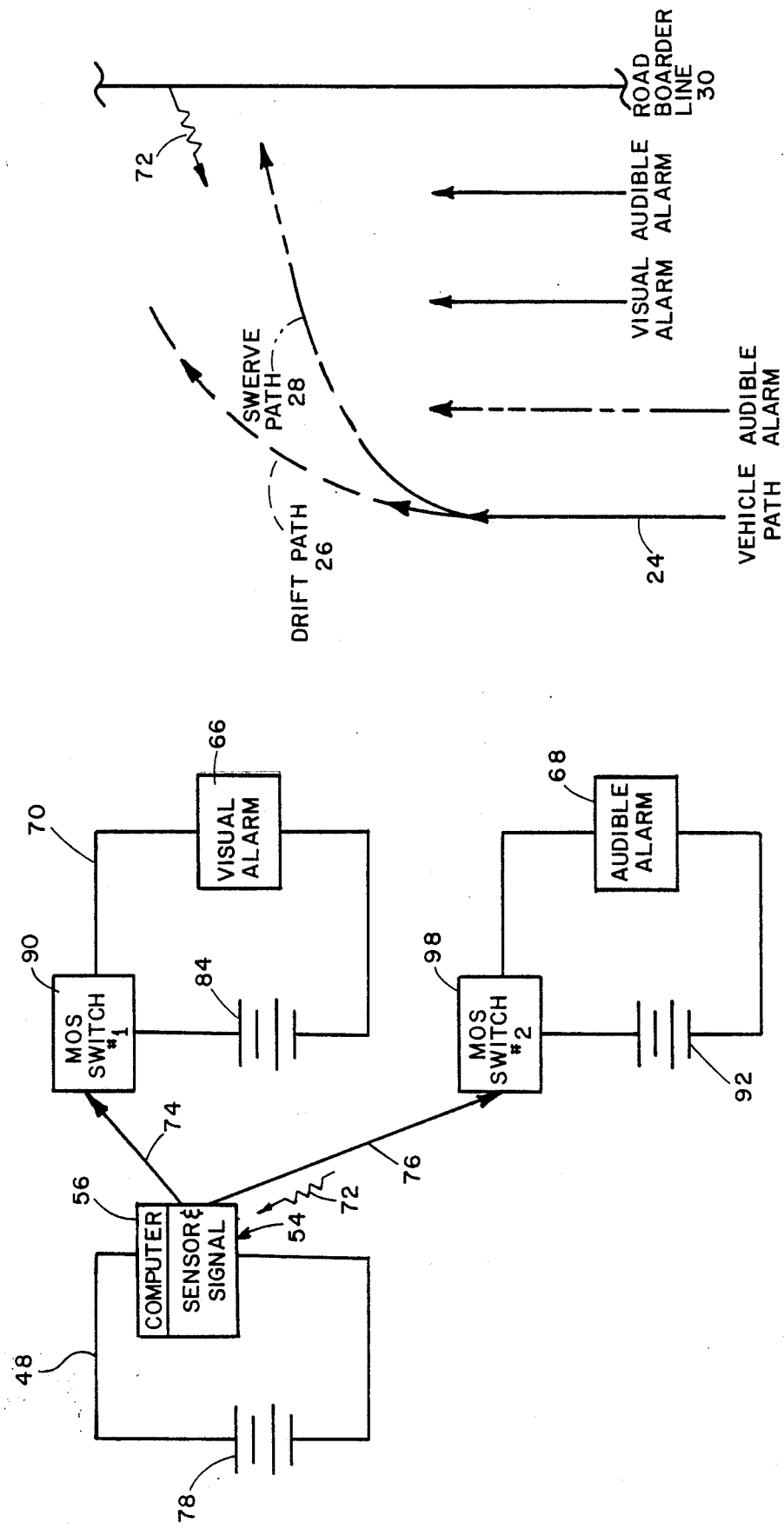
FIG. 4 is a diagram of the overall alarm system of the present invention.

The circuit elements associated with the alarm system 10 are indicated in FIG. 4. This circuit is not intended to be totally complete, with various amplifier elements, and other control elements being omitted from the showing in FIG. 4 since those skilled in the art of electronic circuit design will understand exactly what elements must be included to perform the overall functions and relations set forth herein.

The circuit elements include the sensor transducer 54 that is associated with the microcomputer 56 and which receives nuclear radiation 72 from the lines 30 on the roadway side edge. The transducer 54 emits a first voltage output that is at a first level 74 during a movement along drift path 26 and a second voltage output 76 that is at a second level, greater than the first level, when the vehicle is too close to the roadside edge. The microcomputer increases the voltage output level to the second level if the vehicle moves along the swerve path 28 even if the vehicle is near the center of the roadway in a manner discussed above. The transducer and microcomputer are connected to the power source 78 by line conductors 48.

The transducer is connected to the receiver to activate the visual alarm 66 upon receipt of the signal output 74 and to activate the audible alarm 68 upon receipt of the signal output 76. As shown in FIG. 4, the alarm 66 is connected to a power source 84 by line conductors 70 and a first MOS switch 90, and the alarm 68 is connected to power source 92 by line conductors 70 and a second MOS switch 98.

The MOS switch is fully disclosed in standard textbooks such as "Linear Circuits" by M.E. Van Valkenburg el al and published by Prentice Hall in 1982, the disclosure of which is incorporated herein by reference. The MOS switch utilizes a MOS transistor. The MOS transistor has a critical voltage, and once voltage in excess of such critical voltage is applied between the ground and the source terminals of such MOS transistor, that transistor acts as a short circuit, but acts as an open circuit when voltage less than the critical voltage is applied between the ground and the source terminals. Thus, the transistor acts as a switch that is open until a predetermined voltage is applied and then closes, and will open again as soon as the predetermined voltage is removed. This feature of the MOS switch is used in alarm system 40, with the first MOS switch 90 having a critical voltage that is selected to close the switch 90 upon application of the first output voltage 74 to complete the circuit and activate the visual alarm 66, and the second MOS switch 98 having a critical voltage that is selected to close the switch 98 upon application of the second output voltage 76 to complete the circuit and activate the audible alarm 68.

Figure 5:
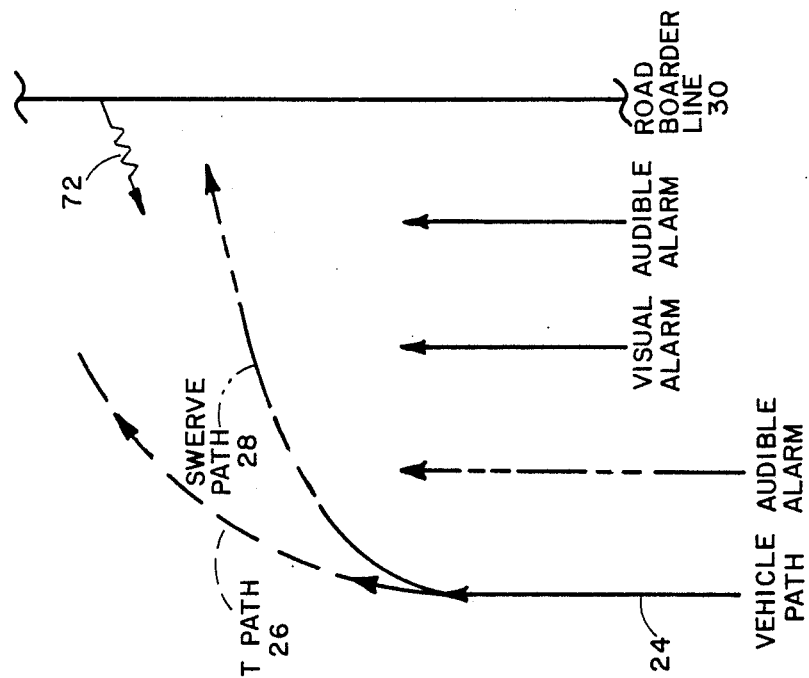
FIG. 5 is a diagram of the operation of the overall alarm system of the present invention.

The action of the alarm system is indicated in FIG. 5. The system activates the visual alarm should the vehicle enter the drift path 26 and activates the audible alarm should the vehicle enter the swerve path 28 or become too close to the roadway edge. The system will activate both the visual and the audible alarms in certain instances, such as when the vehicle is on the swerve path and approaches the roadway edge so close as to require extremely severe corrective action.

It is understood that while certain forms of the present invention have been illustrated and described herein, it is not to be limited to the specific forms or arrangements of parts described and shown.

I claim:

1. An alarm system for use on a land motor vehicle to warn a driver that the vehicle is being driven dangerously close to or dangerously toward a roadway edge comprising:
    (A) two roadway edge marking lines, each roadway edge marking line being located on the roadway edge and extending along that edge and containing material which generates nuclear particles;
    (B) a nuclear particle detection system mounted on the land motor vehicle and including
        (1) a semiconductor ionization detector unit active transducer located on the motor vehicle in position to be impacted by nuclear particles emanating from said roadway edge marking lines and which generates a first output voltage upon detecting nuclear particles having a first intensity level and a second output voltage upon detecting nuclear particles having a second intensity level, said second output voltage being greater than said first output voltage,
        (2) a detector unit power source connected to said detector unit active transducer, and
        (3) a microcomputer connected to said detector unit active transucer to control the output voltage and having a software package therein so that said microcomputer increases detector unit output voltage to said second output voltage if the vehicle approaches one of said roadway edge marking lines with a velocity greater than a predetermined value;
        (4) a visual alarm assembly mounted in the land motor vehicle and including
            (a) a visual alarm indicator,
            (b) a visual alarm indicator power source,
            (c) a visual alarm MOS switch which has a critical voltage less than said first output voltage to be turned on by application thereto of said first output voltage, and
            (d) line conductors connecting said visual alarm indicator to said visual alarm power source via said visual alarm MOS switch; and
    (D) an audible alarm assembly mounted in the land motor vehicle and including
        (1) an audible alarm,
        (2) an audible alarm power source, and
        (3) an audible alarm MOS switch which has a critical voltage less than said second output voltage and greater than said first output voltage to be turned on by application thereto of said second output voltage.

2. The alarm system defined in claim 1 further including a housing mounted on a dashboard of the motor vehicle and having said visual alarm assembly and said audible alarm assembly contained therein.

3. The alarm system defined in claim 2 further including an on/off switch.

* * * * *